United States Patent [19]

Igarashi

[11] Patent Number: 5,802,028

[45] Date of Patent: *Sep. 1, 1998

[54] METHOD OF DATA MANAGEMENT USING RECORDED FLAGS TO DISCRIMINATE USED ALLOCATION BLOCKS AND UNWRITTEN ALLOCATION BLOCKS

[75] Inventor: Tatsuya Igarashi, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 555,842

[22] Filed: Nov. 13, 1995

[30] Foreign Application Priority Data

Nov. 18, 1994 [JP] Japan ................... 6-284716

[51] Int. Cl.$^6$ ............................................ G11B 20/00
[52] U.S. Cl. ........................ 369/58; 369/47; 369/54; 369/32
[58] Field of Search ........................ 369/58, 54, 32, 369/59, 48, 47; 360/72.1, 48, 72.2; 395/600, 425 MS; 235/454, 470, 494

[56] References Cited

U.S. PATENT DOCUMENTS

| | | | |
|---|---|---|---|
| 4,841,498 | 6/1989 | Sugimura et al. | 369/58 |
| 5,107,481 | 4/1992 | Miki et al. | 369/58 |
| 5,111,444 | 5/1992 | Fukushima et al. | 369/58 |
| 5,319,627 | 6/1994 | Shinno et al. | 369/54 |
| 5,481,519 | 1/1996 | Hosoya | 369/58 |
| 5,526,335 | 6/1996 | Tamegai | 369/58 |

*Primary Examiner*—Thang V. Tran
*Attorney, Agent, or Firm*—Jay H. Maioli

[57] ABSTRACT

When data is recorded at a virgin cluster on a data track of an MD data disc, write data is written at a position corresponding to the allocation blocks for recording the write data after NULL data has been written to the write buffer for a one cluster portion. The data for the one cluster portion written to the write buffer is then recorded to the cluster on the data track, so that an initialization process is no longer required.

6 Claims, 21 Drawing Sheets

FIG. 7 (RELATED ART)

Management Table (4 KB)

| # | | | |
|---|---|---|---|
| 0 | Reserved | | |
| 1 | Reserved | | |
| 2 | Reserved | | |
| 3 | Reserved | | |
| 4 | 0 | 00000002 | |
| 5 | 80 | | 04 |
| 6 | 0 | 00000003 | |
| 7 | F0 | 00 | 0008 |
| 8 | FE | | 000A |
| 9 | 00000000 | | |
| 10 | FF | 000005 | |
| 11 | 80 | | 0A |
| 12 | 0 | 00000009 | |
| ⋮ | ⋮ | | |
| 1023 | 00000000 | | |

4 bytes

METHOD OF DATA MANAGEMENT USING RECORDED FLAGS TO DISCRIMINATE USED ALLOCATION BLOCKS AND UNWRITTEN ALLOCATION BLOCKS

BACKGROUND OF THE INVENTION

1. Field of the Invention

The present invention relates to a data recording medium management method, a data recording medium management device and a data recording medium suitable for managing optical discs such as magneto-optical discs.

2. Description of Related Art

Address information referred to as ADIP i.e., "Address In Pregroove", is pre-formed during the manufacture of MD (minidisc: trademark) DATA discs (hereinafter referred to as "MD data discs") via an embossing process. An MD data disc is therefore characterized by it not being necessary to record a sector structure using an initialization process as in the case of magnetic discs. Actual recording of data can then be carried out on this standard physical format in units of 64 kilobyte-clusters, that are 32 collections of 2 kilobyte sectors.

The reason that writing into a cluster cannot be carried out in sector units is seen as being caused by the error detection and correction circuits. Namely, with error correction circuits that are also used for CD's (compact discs: trademark), data is recorded so as to be interleaved in order to provide resistance to burst errors. As a result, recording becomes physically dispersed, even with logically independent sectors. The re-writing of data for a single sector will therefore influence other sector recording regions. With an MD data disc there are 36 sectors at one cluster, of which 32 sectors are used for data recording. 32 sectors (64 KB) of data may be recorded at one time, with the remaining being used as a buffer area. If writing then only takes place at a number of sectors, the data in surrounding sectors will become invalid.

With this kind of MD data disc, an initialization process is carried out before starting use and invalid data is pre-recorded to all of the allocation blocks (to be described later) of all of the clusters. By carrying out an initialization process in this way none of the clusters will be virgin clusters any longer and the reading-in of data will be possible.

The reason why a virgin cluster for which an initialization process has not been carried out cannot be read is because an Address In Pregroove can be detected but a modulation signal cannot be detected. It can then not be detected as to whether this is due to a shift in the tracking or the absence of a modulation signal.

In order to prevent this, an initialization process is carried out before use so as to pre-record invalid data (NULL data) at all of the allocation blocks of all of the clusters on the MD data disc. By carrying out this initialization process all of the clusters are no longer virgin clusters and reading-in of data is possible.

It is for these reasons that conventionally, initialization (physical formatting) and formatting (logical formatting) processes have been carried out on MD data discs before use.

Conventional MD data discs have to undergo an initialization process before use which takes approximately 30 minutes, and therefore cannot be used immediately after purchase.

FIG. 1 is a block diagram showing the structure of an embodiment of an information processing device that the data recording medium management method of the present invention has been applied to. An input device 10 sends data and commands corresponding to key operations made by an operator to a microcomputer 12.

The microcomputer 12 is equipped with a main CPU 14, a ROM 16 pre-stored with programs being used by the CPU 14, a RAM 18 being used as a work area, a timer 19 for generating time information and an input/output interface 20 for sending and receiving various kinds of data between the CPU 14 and external peripheral devices.

A magneto-optical recording/playback device 8 records data provided from the main CPU 14 via the input/output interface 20 to an installed disc when in the recording mode and plays back data from the disc and outputs the data to the main CPU 14 via the input/output interface 20 when in the playback mode.

FIG. 2 is a block diagram showing an example of the structure of the magneto-optical recording/playback device 8 in FIG. 1. The magneto-optical recording/playback device (MDXD) 8 records information on or reproduces information from a recording media which stores within a cartridge one of a 64 mm diameter read (playback) only optical disc, a dual read-write-type i.e. a re-writable MO (magneto-optical) disc, or a hybrid (partial ROM) disc having a region for both reading and writing (i.e. rewriting) and a region for reading only.

Data is recorded on MO discs and hybrid discs using a magnetic field modulation overwrite recording method. In the case of read-only optical discs, a played-back signal is detected by utilizing diffraction of light at the pit rows of the object track while in the case of read/write magneto-optical discs, the played back signal is detected by the difference in the polarization angle (Kerr angle of rotation) of light reflected from the object track.

This kind of magneto-optical recording/playback device 8 may be used in a part of an MD (mini-disc (trademark)) system developed for use with personal audio equipment (portable, stationary, or vehicle-mounted types). In the development process for personal audio equipment, MD systems have optimized the integration of each of the circuit elements and optimized the mechanical parts so that the overall device is small and light-weight. Battery operation is also possible as a result of low power consumption. Further, MD systems have almost the same storage capacity (140 Mbytes) as existing 3.5 inch MO drives with changing of the recording media also being possible. The cost of mass-producing the actual device bodies and recording media may be reduced when compared with other MO disc drives and a sufficient degree of reliability may be achieved when used as personal audio equipment.

In FIG. 2, magnetic field modulation overwrite recording is carried out along the recording tracks on a magneto-optical disc 804, which is rotatably driven by a spindle motor 802, by applying a magnetic field modulated in accordance with the data to be recorded using a magnetic head 808 with a laser light beam being projected from an optical pick-up 806. The data is played back magneto-optically by tracing the recording tracks on the magneto-optical disc 804 with the laser light beam from the optical pick-up 806.

The optical pick-up 806 is constructed from optical parts, for example, laser light sources such as laser diodes, a collimator lens, an object lens, a polarization beam splitter and a cylindrical lens etc. as well as a photodetector or the like divided into a prescribed shape and is positioned opposite to the magnetic head 808 by a feed motor 810 in a position so as to sandwich the magneto-optical disc 804.

When data is recorded on the magneto-optical disc 804, the magnetic head 808 is driven by a magnetic head driving circuit 809 and a magnetic field modulated in accordance with the recording data is applied to the magneto-optical disc 804. The optical pick-up 806 then carries out data recording via thermo-magnetic recording by illuminating the object track of the magneto-optical disc 804 with laser light.

The optical pick-up 806 detects focus errors by, for example, astigmatic techniques and detects tracking errors by, for example, push-pull techniques by detecting the laser light illuminating the object track. The difference in the polarization angle (Kerr angle of rotation) of light reflected back from the object track is detected when data is played back from the magneto-optical disc 804 and a playback signal is generated.

The output of the optical pick-up 806 is given to an RF circuit 812. The RF circuit 812 extracts the focus error signal and the tracking error signal from the output of the optical pick-up 806 and sends the signals to a servo controller circuit 814. The RF circuit 812 also puts the playback signal into binary form and sends this signal to an address decoder 816. The address decoder 816 decodes and outputs to an EFM (Eight to Fourteen Modulation) .CIRC (Cross Interleave Reed-Solomon Code) encoder/decoder 818 an address from the supplied binary playback signal. The address decoder 816 also outputs binary playback data playback data other than binary playback data relating to the address to the EFM.CIRC encoder/decoder 818.

The servo controller circuit 814 comprises, for example, a focus servo controller circuit, a tracking servo controller circuit, a spindle motor servo controller circuit and a thread servo controller circuit.

The focus servo controller circuit carries out focus control of the optical system for the optical pick-up 806 so that the focus error signal becomes zero. The tracking servo controller circuit controls the feed motor 810 (or a tracking actuator) of the optical pick-up 806 so that the tracking error signal becomes zero.

Further, the spindle motor servo controller circuit controls the spindle motor 802 so that the magneto-optical disc 804 is rotatably driven at a prescribed rotational velocity (for example, a constant linear velocity). Further, the thread servo controller circuit shifts the magnetic head 808 and the optical pick-up 806 using the feed motor 810 to the position of an object track on the magneto-optical disc 804 designated by a system control CPU 820.

The EFM.CIRC encoder/decoder 818 carries out error correction encoding processing i.e. CIRC encoding processing and modulation processing appropriate for the recording i.e. EFM encoding processing on data provided via an interface 800.

Encoded data outputted from the EFM.CIRC encoder/decoder 818 is provided to the magnetic head driving circuit 809 as recording data. The magnetic head driving circuit 809 drives the magnetic head 808 so that a modulated magnetic field corresponding to the recording data is applied to the magneto-optical disc 804.

The system control CPU 820 controls the recording position on the magneto-optical disc 804 so that the recording data is recorded on the recording track of the magneto-optical disc 804 when a writing instruction is being received via the interface 800. The control of this recording position is carried out by the system control CPU 820 managing the recording position of the encoded data on the magneto-optical disc 804 outputted from the EFM.CIRC encoder/decoder 818 and a control signal indicating the recording position on the recording track of the magneto-optical disc 804 being provided to the servo controller circuit 814 from the system control CPU 820.

During playback, the EFM.CIRC encoder/decoder 818 carries out EFM demodulation processing and CIRC decoding processing for error correction on the inputted binary playback data and outputs the resulting data via the interface 800.

When a read-out instruction is being received via the interface 800, the system control CPU 820 controls the playback position with respect to the recording track of the magneto-optical disc 804 so that the playback data is obtained sequentially. This control of the playback position is carried out by the position on the disc for the playback data being managed by the system control CPU 820 and a control signal for indicating the playback position on the recording track of the magneto-optical disc 804 being provided to the servo controller circuit 814.

FIG. 3 shows an example of audio data and computer data recorded on a re-writable magneto-optical disc 804. As shown in FIG. 3, a lead-in area and a lead-out area are provided at the side of the innermost periphery and the side of the outermost periphery of the information area going from the innermost periphery (center and left side of the drawing) to the outermost periphery (center and right side of the drawing). TOC (Table of contents) data and the like is recorded as necessary at these lead-in and lead-out areas. Ordinary users cannot record information at these regions.

Areas of the information area other than the lead-in areas and the lead-out areas are taken as recordable areas and ordinary users can record or playback data in these areas.

A UTOC (User TOC) area is provided at the side of the innermost periphery of the recordable area, outside of which a program area (Program area) is provided. The UTOC area is recorded with UTOC data corresponding to the recording data recorded at the program area by the user. Audio data, data processed by computer, or other data may be recorded at the program area.

Each item of data is recorded discretely at the program area as deemed necessary. Each discretely arranged region is referred to as a part, with one track being formed from linked parts. In the embodiment in FIG. 3, a track Trk1 is recorded with audio data. i.e. this track is taken as an audio track. This track Trk1 is constructed from two parts (Trk1-1 and Trk1-2). The parts (tracks) Trk1-1 and Trk1-2 are formed in separate positions on the disc. However, when this data is, for example, played back, the optical pick-up 806 seeks the part Trk1-2 when playing-back of the part Trk1-1 is completed and then plays this back so that the playback data is obtained in sequence.

In this embodiment, audio tracks Trk2-1 and Trk4-1 are further formed as one part and the audio data is recorded.

Further, in this embodiment, a data track Trk3 is comprised of parts Trk3-1 through to Trk3-3, where data processed by the main CPU 14 is recorded.

The EFM.CIRC encoder/decoder 818 carries out processing for each of the tracks of the program area so that data recording and playing back, hereinafter referred to simply as "recording/playback", is carried out in units of 64 kilobyte "clusters".

A data track is comprised of a volume management area, recorded with directory information etc. and information for managing volume, and an extent area recorded with actual file data. The volume management area is formed at the head of the data track formed at the start of the program area. The extent area is then taken to be the remaining regions.

In this embodiment, the head of the data track formed at the start of the program area corresponds to the head of the part Trk3-1 and it is here that the volume management area is formed.

The units allotted to the data for the volume management area and the extent area are managed independently with, for example, the former being taken as b 2kilobytes and the latter being taken as any of either 2 kilobytes, 4 kilobytes, 8 kilobytes, 16 kilobytes 32 kilobytes or 64 kilobytes (for example, 8 kilobytes).

The volume management area is constructed from 32 clusters, as shown in FIG. 4, with a one-cluster boot cluster being provided one cluster previous to the volume management area.

FIG. 5 shows the format of the volume management area. The volume management area comprises 32 clusters, with one cluster being comprised of 64 kilobytes. At the management area there are 1024 of 2 kilobytes management blocks numbered in ascending order from 0 to 1023.

A volume descriptor VD is recorded at the first management block of number 0. In addition to information regarding the overall volume such as volume name and date of manufacture, for example, the number (any value from 0 to 1023 (in the case of this embodiment, 4)) of the management block recorded with the root directory is also recorded at this volume descriptor.

A Volume Space Bitmap (VSB) is provided at the first management block, with data displaying the conditions of use of the whole of the magneto-optical disc 804 being recorded at this VSB.

Namely, the volume space bitmap manages the conditions of use of the whole of (in particular, the extent area) the disc using allocation units known as allocation blocks. The value for the allocation blocks may be taken as any of the values of 2 kilobytes, 4 kilobytes, 6 kilobytes, 8 kilobytes, 6 kilobytes, 32 kilobytes or 64 kilobytes but as this will play a large part in designating the allocation units for the extent area the value in this embodiment is taken to be 8 kilobytes, as described above. All of the allocation blocks in the disc are given allocation block numbers starting in ascending order from 0. Absolute positions on the disc are then specified using these numbers.

The volume space bitmap is, for example, as shown in FIG. 6, a two bit entry attached to a number corresponding to each allocation block number. Each entry is provided in ascending order in the same way as for the allocation blocks. The volume space bitmap is comprised of a plurality of management bloc k s when one management block is not sufficient to express all of the allocation blocks.

Namely, co des having the following meanings are recorded at the volume space bitmap so as to correspond to each of the allocation block recording conditions.

00 Space usable (available allocation block)

01 space used (used allocation block)

10 space defective (defective allocation block)

11 space not usable (unavailable allocation block).

Usable allocation blocks (available allocation blocks) are allocation blocks for which the blocks are indicated as being usable for data recording, and may be allotted as blocks for recording file data.

A used allocation block is an allocation block that has already been allotted to a prescribed file as a block for recording a file.

A defective allocation block means that this allocation block includes a defect and cannot be allotted to a file.

An unavailable allocation block indicates an allocation block in a region other than the data track within the MD data disc. This allocation block cannot be allotted as a block for recording files.

A Management Table, hereinafter referred to as "MT", is provided at the 4 kilobytes management table comprised of numeral 2 and numeral 3 of FIG. 5, with the conditions of use of the volume management area being entered in this MT.

FIG. 7 is a schematic view of the management table comprised of the two management tables 2 and 3. In FIG. 7, each of the 4 bytes entries shown by number 0 to 1023 correspond to the 2 kilobytes management blocks shown by the numbers 0 to 1023 of FIG. 5. Because the four management blocks 0 to 3 shown in FIG. 5 are pre-defined by a standard, i.e. fixed, predetermined fixed data is recorded (taken as "Reserved") at the four corresponding entries in the management table of FIG. 7.

As shown in FIG. 5, directory record blocks (DRB) or extent record blocks (ERB) are provided at the management blocks after number 4.

FIG. 8 and FIG. 9 show the process at the time of conventional MD data disc file writing.

First, in step S51, a continuous allocation block corresponding to the amount of write data is searched for within the cluster corresponding to the file position (write start position) indicated by the file directory record and the extent records tree.

At the MD data disc, the data track is partitioned into an extent area for recording file data and a volume management area recorded with management information for managing the extent area. The directory records and the extent records are recorded at this volume management area.

Next, in step S52, it is determined whether or not a continuous allocation block has been found. If so, the process goes on to step S53 and data recorded at each allocation block of the cluster including the allocation block intended for recording is read and then read into the write buffer. Then, in step S54, it is determined whether or not data can be read-in from the MD data disc. If not, the process goes on to step S55, an error process is carried out, and the write process is completed.

Incidentally, if data is not written at each of the allocation blocks of the cluster including the allocation block to be the recording target, that is, if this cluster is a virgin cluster, data cannot be read-in from this cluster (the process in step S75 and step S73 of FIG. 11 to be described later). As a result, in step S55, an error process is executed and it will eventually not be possible to record on the virgin cluster.

If it is determined in step S54 that data can be read-in from the cluster, the process goes on to step S56 and data stored in the RAM region (recording data) is copied to a position corresponding to the allocation block taken as the recording target within the write buffer. One cluster portion of data recorded within the write buffer is then recorded at the cluster taken as the write target.

Next, a determination is made in step S57 as to whether or not all of the data it is intended to record has been written-in. If there is still some data it is intended to record remaining, the process goes on to step S58 and the file position (recording position) is updated. The process then returns to step S51 for repeating the same process.

If it is determined in step S57 that all of the data has been written-in, the write process is complete.

FIG. 10 is a schematic view of the above process. As shown in FIG. 10, one cluster portion of data from within the data track is written into the write buffer, with the allocation block data taken as the write target of this data written in the write buffer being re-written with recording data. Then, one cluster portion of data included in the re-written allocation block data is re-recorded at this cluster on the data track.

On the other hand, if it is determined in step S52 that a continuous allocation block corresponding to the amount of recording data does not exist within the cluster, the process proceeds from step S52 to step S59 and an available allocation block region is searched for from the volume space bitmap recorded at the volume management area.

A determination is made in step S60 as to whether or not a usable allocation block (available allocation block) can be found from the volume space bitmap. If not, the process goes on to step S61, a disc full process is executed as no more data can be recorded because data has been recorded on all of the recordable regions (extent areas) of the MD data disc, and the write process is complete.

If, however, it is determined in step S60 that an available allocation block can be found, the process goes to step S62 and the found region is listed in the volume space bitmap as a used allocation block. Then, in step S63, this data is updated so that the currently obtained allocation block can be managed using the directory record and the extent record free.

Next, it is determined in step S64 whether or not the file size of the file for which the data is recorded differs from the sum of the file position (the final position of this file) and the write byte number. i.e. it is determined whether or not an allocation block capable of recording all of the data can be secured. If it is determined that a sufficient number of allocation blocks cannot yet be secured, the process returns to step S59 for repeating the process thereafter. If it is determined in step S64 that a sufficient number of allocation blocks can be secured, the process returns to step S51 for repeating the process thereafter.

FIG. 11 shows a process for reading data from a file recorded in the above way. First, in step S71, an allocation block corresponding to the read data amount within the cluster corresponding to the file position designated as the read target by the directory record and extent record of the file is looked for. It is then determined whether or not this could be found in this search in step S72. If not, an error process is carried out in step S73 and the read-in process is completed.

If it is determined in step S72 that an allocation block could be found, the process goes on to step S74, the data for this allocation block is read from the MD data disc and is then read into the designated region of RAM. If it is then determined in step S75 that the data could not be read-in from the MD data disc, the process goes to step S73 for carrying out an error process, and the read-in process is completed.

As described above, it is necessary to read all of the allocation block data included in the allocation blocks taken as the write target in order to record data at a prescribed allocation block within a cluster. However, in the case of, for example, an MD data disc for which an initialization process has not been carried out, that is, in the case of a virgin disc, it will eventually not be possible to read-out from the disc because data has not yet been recorded. As a result, it will also eventually not become possible to record.

If it is determined in step S75 that allocation block data could be read-in, the process goes on to step S76. It is then determined whether or not all of the data has been read-in. If un-read data still remains, the process goes on to step S77 and the file position (read-out start position) is updated. The process then returns to step S71 for repeating the process thereafter. If it is determined in step S76 that all of the data has been read-in, the read process is completed.

When data is recorded at all of the sectors (allocation blocks) comprising one cluster it is possible to carry out the recording operation immediately. However, when data is recorded at sectors (allocation blocks) at only a part of one cluster, data recorded at other sectors (allocation blocks) of this cluster is read out. After this has been stored in memory, data to be recorded in the sector taken as the recording target is added to the memory and one cluster portion of data is prepared. Data is then recorded in each sector (allocation block) of the cluster.

However, if the data for all of the sectors (allocation blocks) recorded at this cluster cannot be read out the data cannot be recorded at all of the sectors (allocation blocks) comprising the clusters. It therefore eventually becomes necessary to record prescribed data beforehand at other sectors (allocation blocks) in order to record data at sectors (allocation blocks) for a part of the cluster.

SUMMARY OF THE INVENTION

In view of the foregoing, the present invention sets out to resolve this problem so that use of a recording medium may be started immediately without pre-recording invalid data.

Therefore, in the present invention, a data recording medium management method for managing a data recording medium for recording and playing back data in units of logical blocks (for example, allocation blocks) comprises the steps of managing the logical blocks using management codes recorded on the data recording medium, recording a used code (for example, 01) as the management code for a logical block when data is actually recorded at a logical block and recording an un-written code (for example, 11) as the management code when a logical block has been allotted as a region for recording data but data has not yet actually been recorded.

The management codes may be recorded at a different region than that at which the data is recorded.

The management codes may be used in common as codes (for example, a code 11 displaying that use is not possible) for indicating regions of the data recording medium other than the region for recording the data.

The management codes may include at least one of a usable code (for example, 00) indicating the presence of a region capable of being used for recording data and a defect code (for example, 10) indicating the presence of a region having a defect.

In this data recording medium management method, a used allocation block code (01) is recorded as the management code but an un-written allocation block code (11) is recorded when a region has been allotted as a region for recording but data has not yet actually been recorded. It is therefore possible to discriminate between used allocation blocks and un-written allocation blocks, so that an initialization process may be omitted.

In the present invention, a data recording medium management method for managing a data recording medium for recording data in units of recording blocks (for example, clusters) comprised of a plurality of logical blocks (for example, allocation blocks) and playing back data in logical block-units comprises the step of recording prescribed data at the prescribed logical blocks comprised of the recording blocks and recording dummy data (for example, NULL data) at the remaining logical blocks comprised of the recording blocks when recording the prescribed data at the logical blocks for the first time.

When recording prescribed data at the logical blocks for the first time, the prescribed data to be recorded is stored at a position corresponding to the logical block taken as the recording target and data recorded in the write buffer is recorded, after the dummy data for the first recording block portion is stored in the write buffer.

With the data recording medium management method of the present invention, prescribed data is recorded at prescribed allocation blocks comprising a cluster when prescribed data is recorded at the allocation block for the first time and NULL data is recorded at the remaining allocation blocks comprising the cluster. It is therefore possible to omit the initialization process and record at greater speed.

In the present invention, a recording medium for recording and playing back data in units of logical blocks (for example, allocation blocks) comprises a first region for recording the data and a second region (for example, the volume management area of FIG. 4) for recording management data for managing the first region. A used code (for example, 01) indicating that data is actually recorded at a logical block and a un-written code (for example, 11) indicating that a logical block has been allotted for recording data but data has not yet actually been recorded are recorded at the second region.

With this data recording medium, a used code (01) and a un-written code (11) for managing data recorded at the extent area are recorded at the volume management area. An initialization process therefore does not have to be carried out and a data recording medium capable of recording and playing back data can be realized.

BRIEF DESCRIPTION OF THE DRAWINGS

FIG. 7 is a schematic view showing the structure of a management table;

DETAILED DESCRIPTION OF THE PREFERRED EMBODIMENTS

First Embodiment

Figure 12:
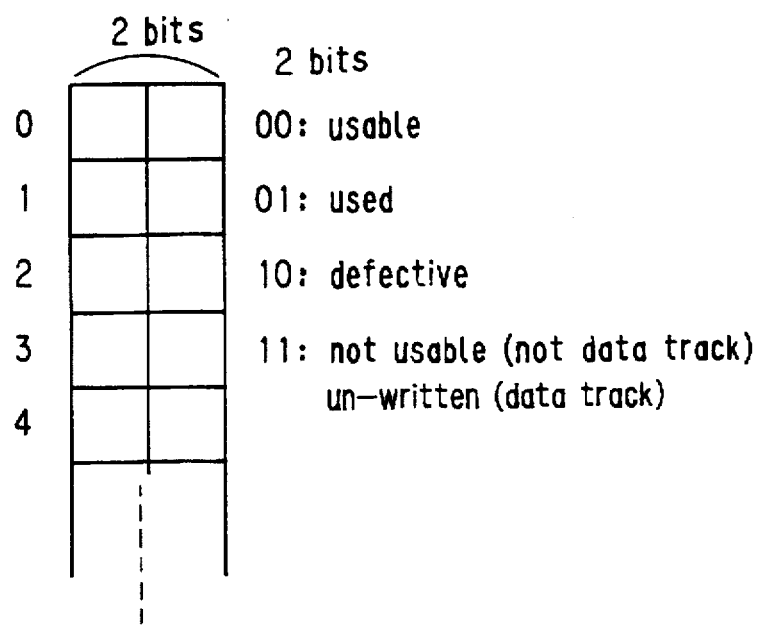
FIG. 12 is a view illustrating the structure of the volume space bitmap of the present invention.

First, FIG. 12 is a view illustrating the structure of the volume space bitmap in an embodiment of the present invention.

Figure 1:
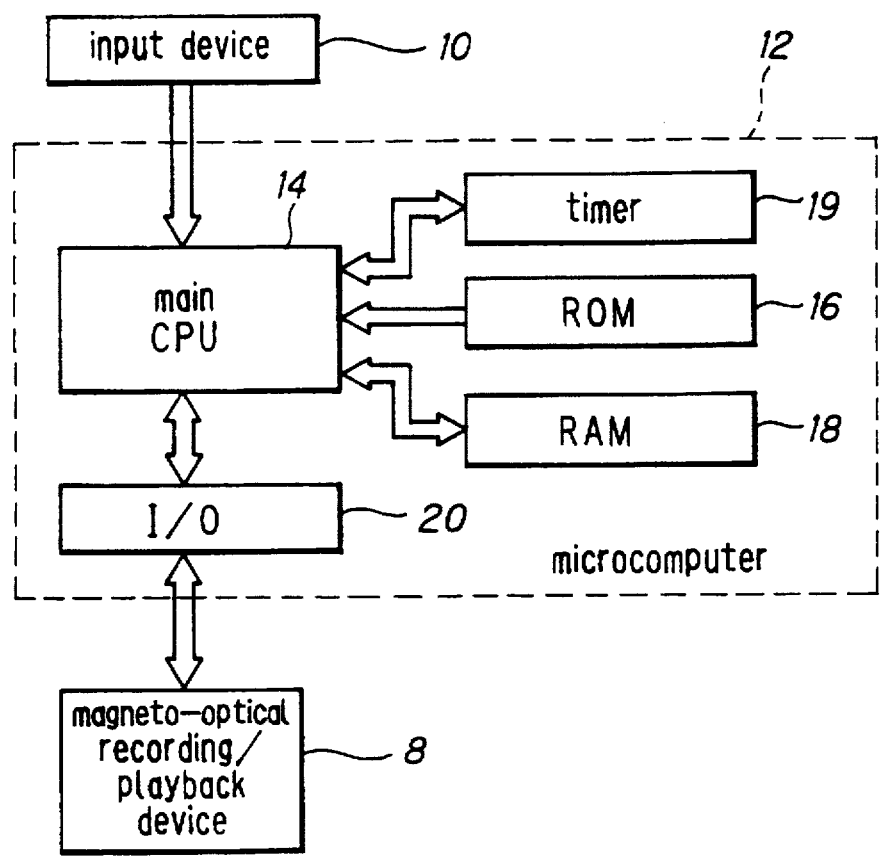
FIG. 1 is a block diagram showing the structure of an embodiment of an information processing device to which the data recording medium management method of the present invention is applied.
Figure 2:
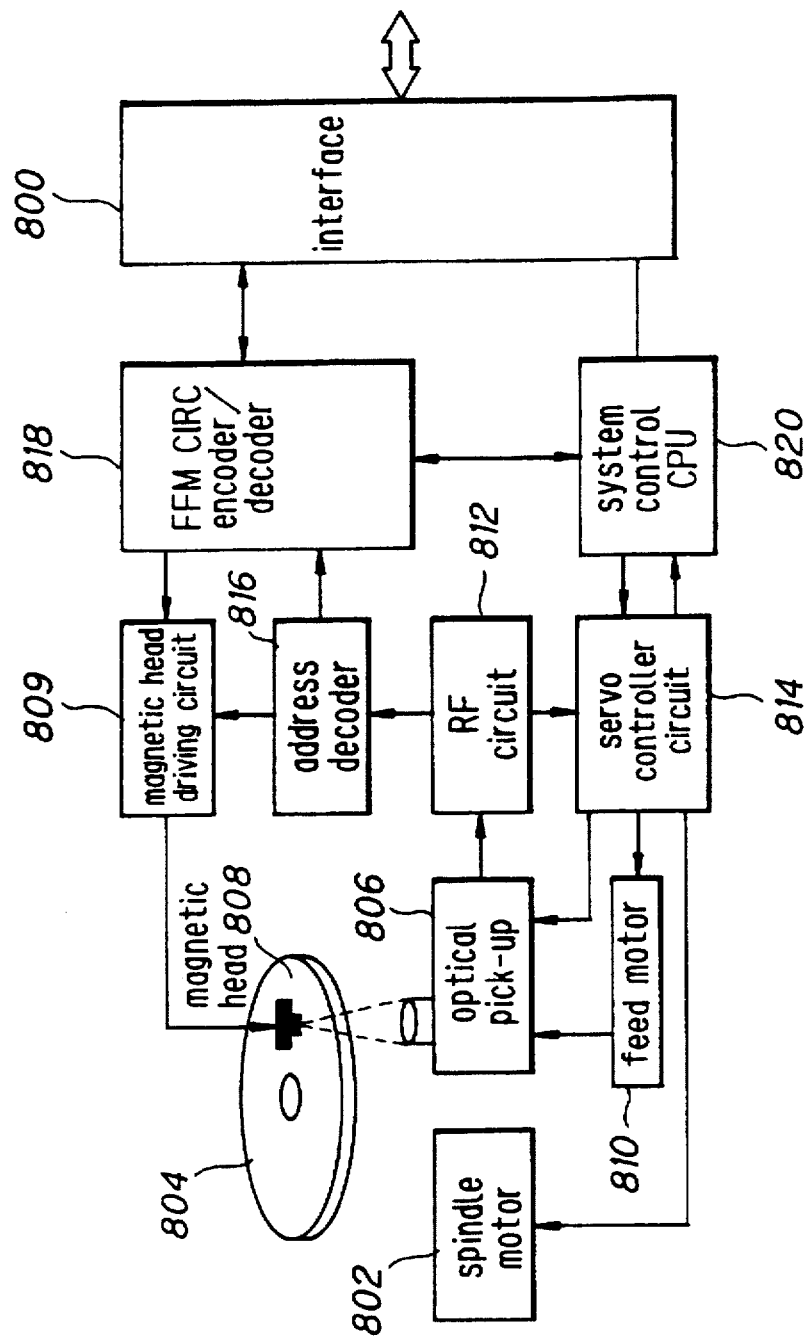
FIG. 2 is a block diagram showing an example structure of a magneto-optical recording/playback device of the same embodiment.
Figure 3:
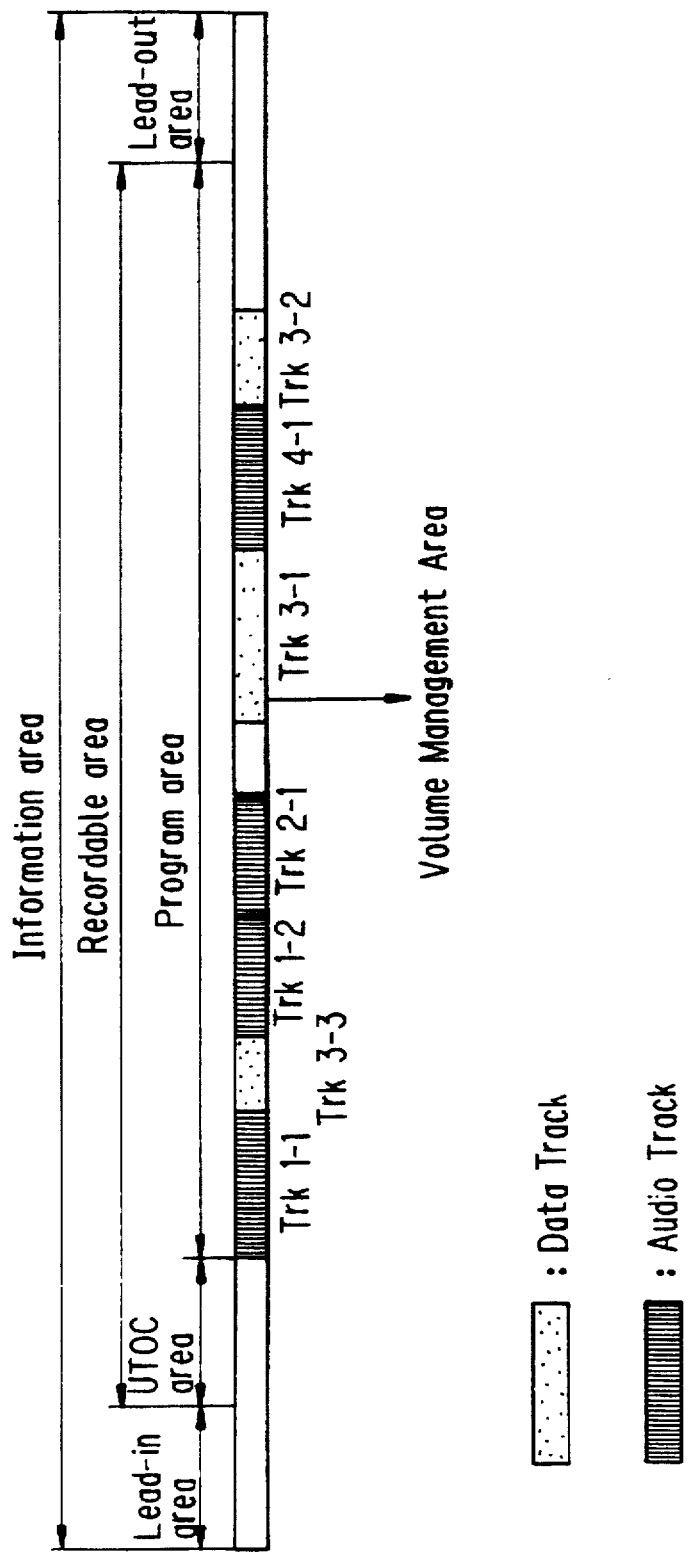
FIG. 3 is a view illustrating the format of a magneto-optical disc.
Figure 4:
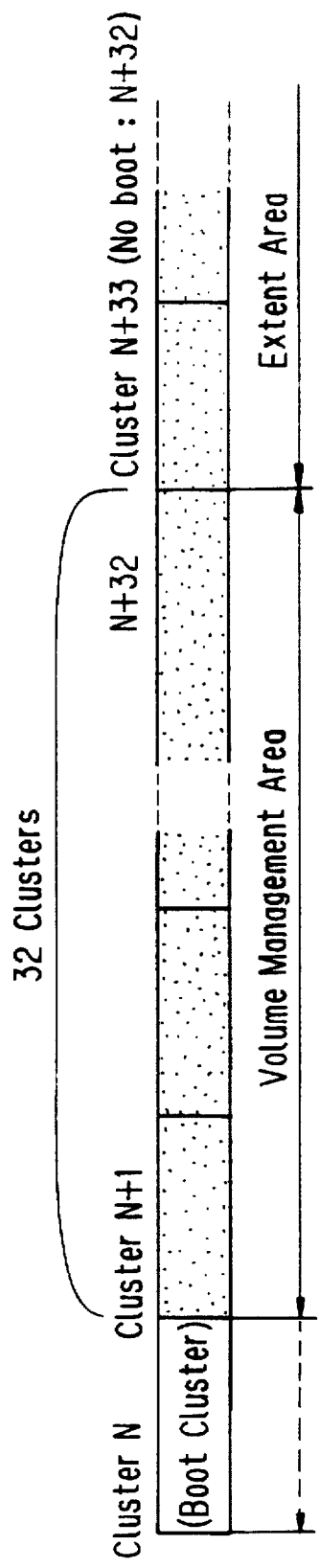
FIG. 4 is a view illustrating a data track format.
Figure 5:
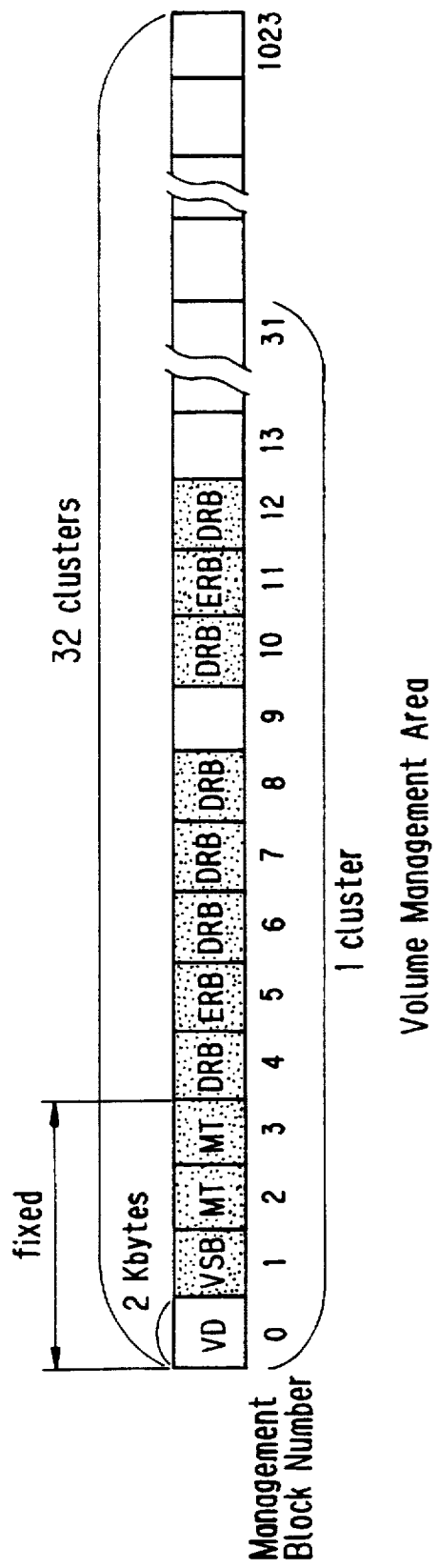
FIG. 5 is a view illustrating a volume management area format.
Figure 6:
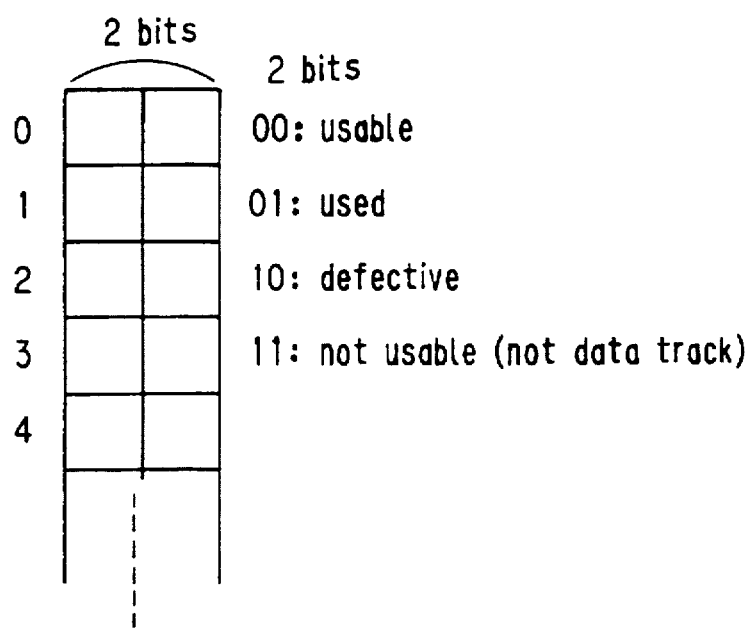
FIG. 6 is a view illustrating the structure of a conventional volume space bitmap.
Figure 8:
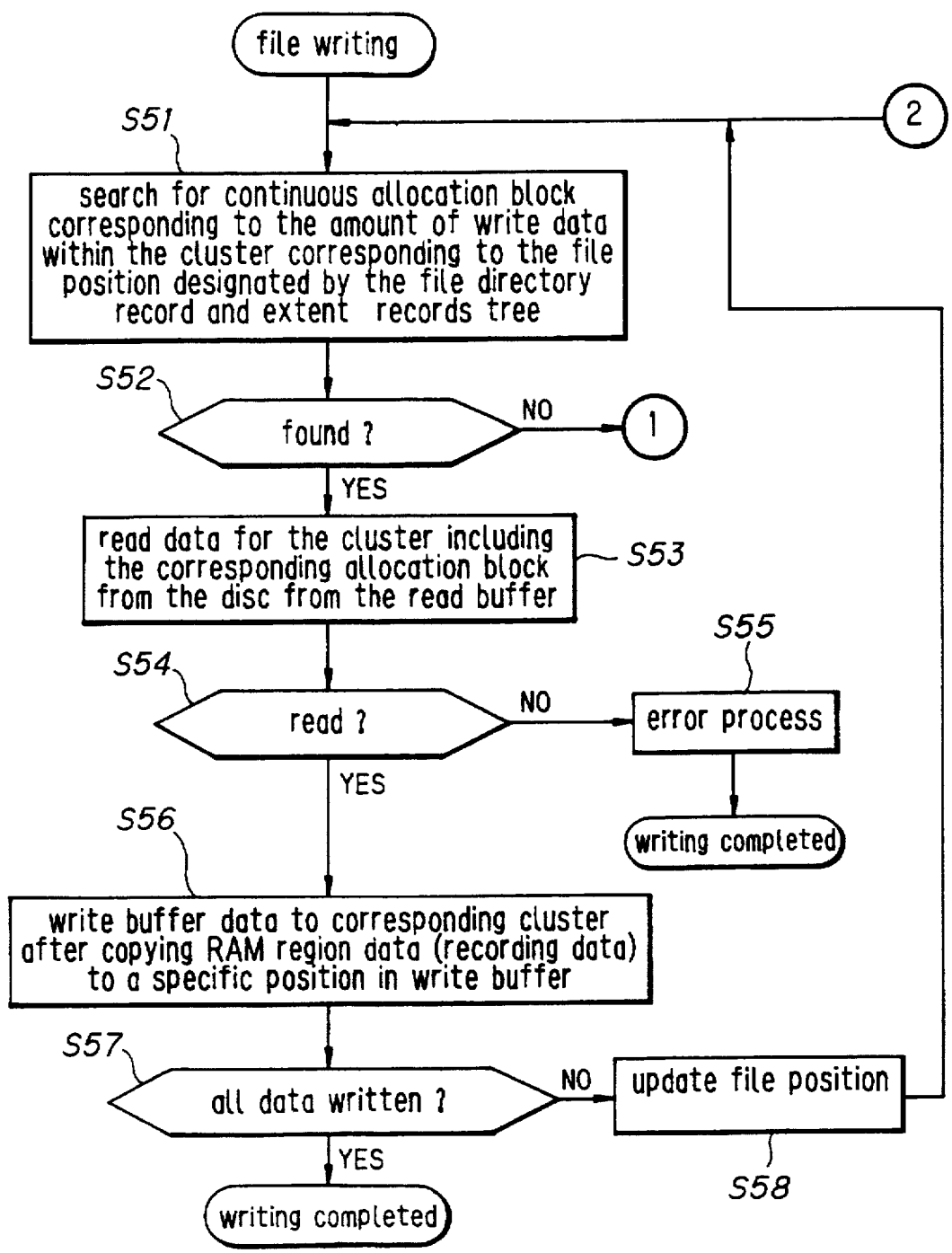
FIG. 8 is a flowchart illustrating a conventional MD data disc write-in operation.
Figure 9:
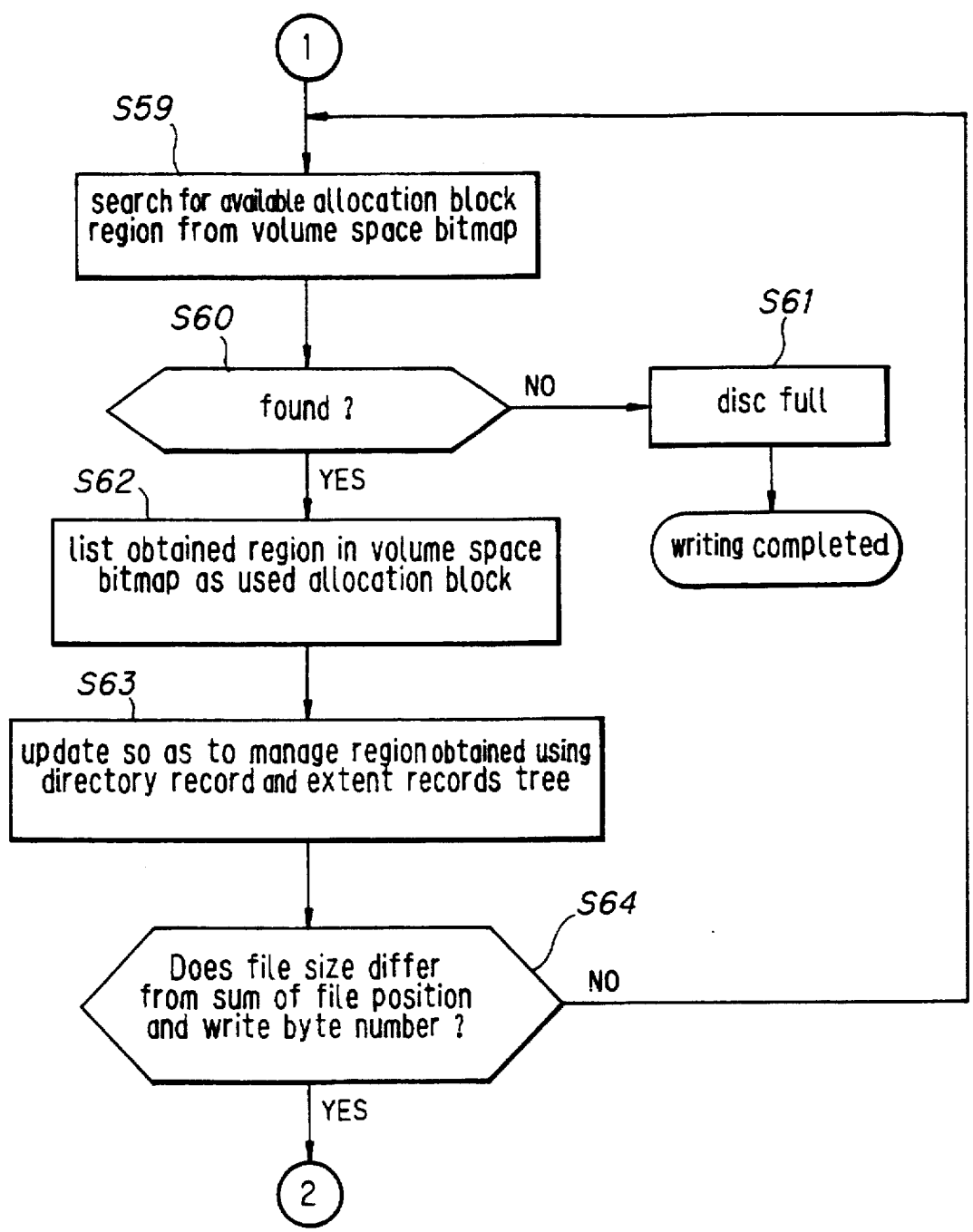
FIG. 9 is a further flowchart illustrating a conventional MD data disc write-in operation.

The value (code) for the two bits for each entry for the volume space bitmap has the following meaning compared with the conventional one shown in FIG. 6.

| | |
|---|---|
| 00 | Available Allocation Block |
| 01 | Used Allocation Block |
| 10 | Defective Allocation Block |
| 11 | Unavailable Allocation Block |
| | Un-written Allocation Block |

Of the two-bit values (codes) for each of the entries, available allocation block and defective allocation block have the same meaning as in the prior art but used allocation block and unavailable allocation block have a somewhat different meaning to that in the prior art.

Namely, in the prior art, used allocation block (01) dose not just mean allocation blocks where data is actually recorded but also means allocation blocks where a region has been allocated for recording data but data has not yet actually been recorded. In this embodiment, used allocation block just means allocation blocks where data is actually recorded Therefore, allocation blocks where an allocation for recording data for files has been received but the data has not yet been recorded are taken to be un-written allocation blocks (11).

"(11)" is also used for unavailable allocation blocks but un-written allocation blocks and unavailable allocation blocks may be distinguished from each other because un-written allocation blocks are allocation blocks that exist within data tracks and unavailable allocation blocks exist in tracks outside data tracks.

For example, allocation blocks for boot clusters and volume management areas are entered as used allocation blocks (01) and extent area allocation blocks are entered as available allocation blocks (00).

Although this is described in detail later, when file data is to be recorded in the extent area in file data recording, available allocation blocks (00) are searched from the volume space bitmap and un-written (11) allocation blocks are taken. The corresponding entry in the volume space bitmap is then changed to used allocation block (01) after data has been recorded in this allocation block. If a file is deleted, this is taken as a available allocation block (00) and this entry is amended. In this way, the extent area is managed by the volume space bitmap.

Figure 13:
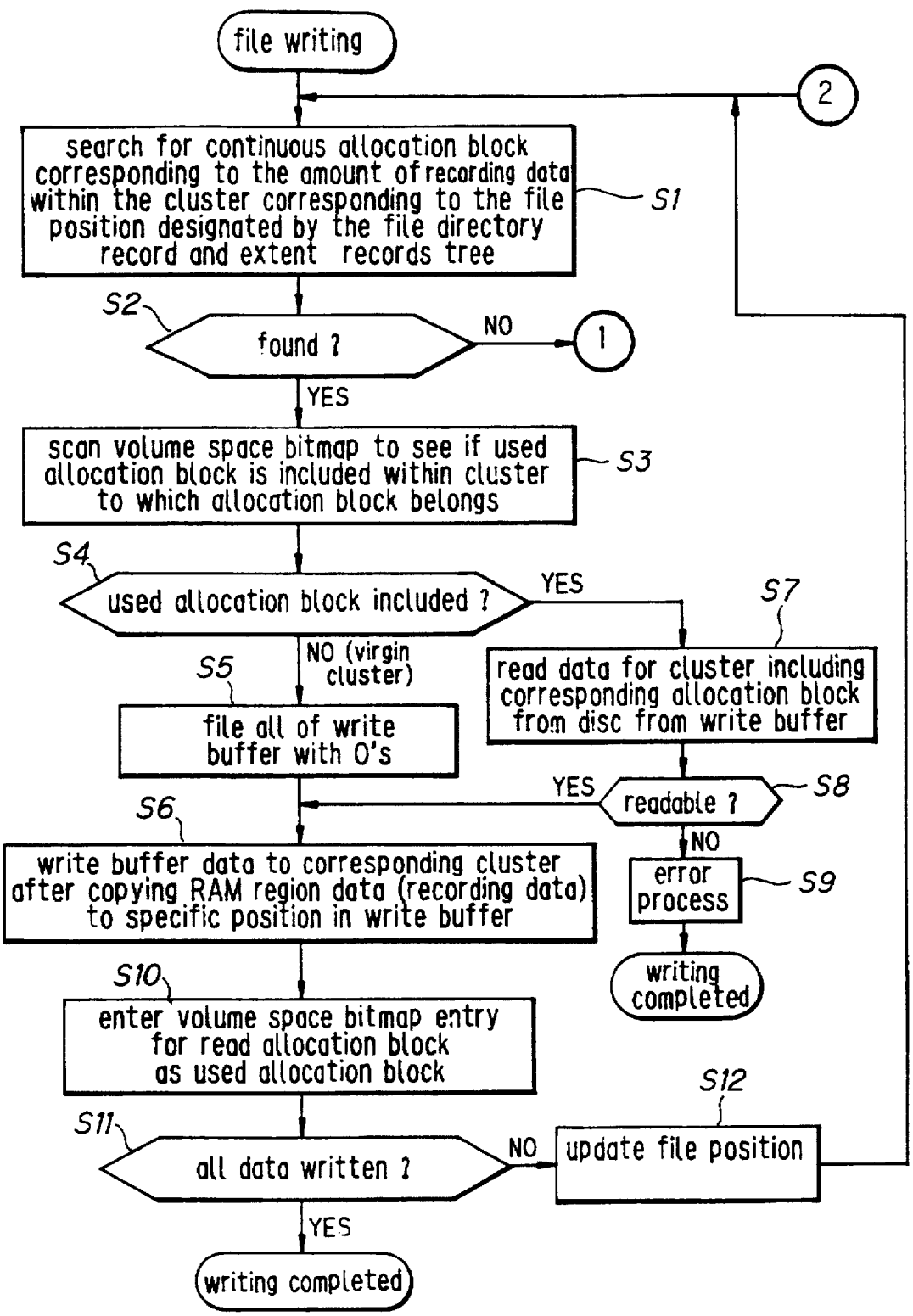
FIG. 13 is a flowchart illustrating the write-in operation for the embodiment of the present invention.
Figure 14:
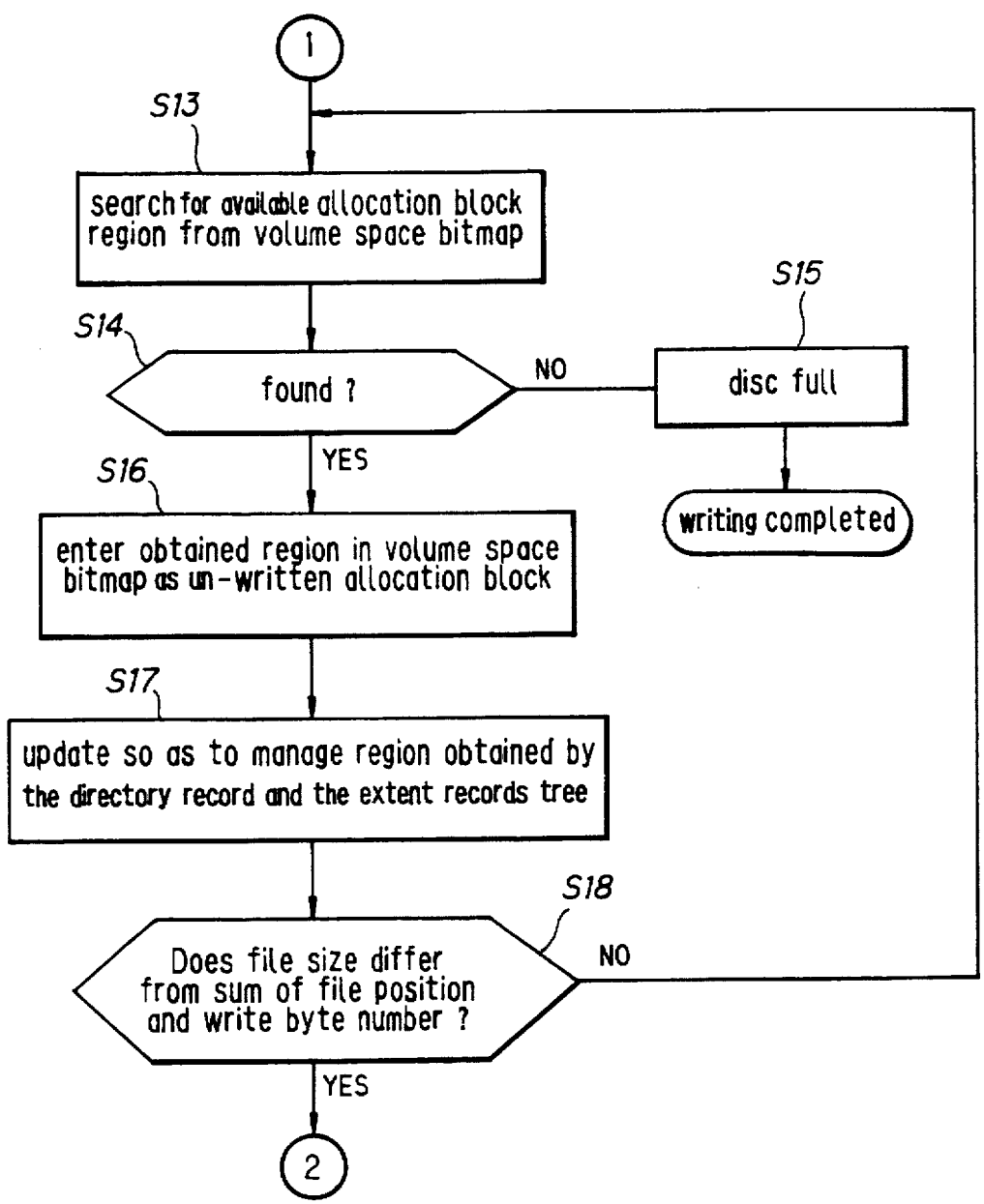
FIG. 14 is a further flowchart illustrating the write-in operation for the embodiment of the present invention.

Next, the operation of recording prescribed file data is described with reference to the flowcharts of FIG. 13 and FIG. 14. It should be noted that the volume management area data is read-out when the magneto-optical disc 804 is installed and is therefore already buffered in the RAM 18.

In step S1, a continuous allocation block corresponding to an amount of recorded data within the cluster corresponding to the file position (write position) indicated by the file directory record and the extent record tree is searched for. If it is determined in step S2 that this allocation block could not be found, the process goes to step S13 and an available allocation block (00) is searched from the volume space bitmap. If this available allocation block cannot be found, it is determined in step S14 for this MD data disc that there are already no remaining recordable regions for recording new data. The process therefore goes on to step S15 to execute a disc full process, and the write process is completed.

If it is determined in step S14 that the available allocation blocks have been found, the process goes to step S16 and the searched available allocation blocks are recorded in the volume space bitmap as un-written allocation blocks (11). In this way, these allocation blocks are secured as regions for recording file data.

Next, the process goes on to step S17 and the management data in the directory record and the extent record is modified so as to be able to control the allocation blocks secured in step S16. Further, step S18 determines whether or not the file size of the data to be recorded has reached the sum of the file position (the final position of this file) and the number of bytes to be written, that is, whether or not a sufficient recording region has been secured for writing the data from herein. If a sufficient region has not been secured, the process returns to step S13 for repeating the process thereafter. If a sufficient region has been secured, the process returns to step S1 for executing the process thereafter.

If it is determined in step S2 that the allocation blocks for writing the data could be found, the process goes on to step S3 and an inspection is made by referring to the volume space bitmap as to whether or not a used allocation block (01) is included within the cluster to which this allocation block belongs. If it is determined in step S4 that a users allocation block is not included, the process moves on to step S5 and one cluster portion of NULL data ("0"data) is stored in the write buffer for storing one cluster portion of write data.

In this embodiment, this initial process is omitted for the MD data disc (magneto-optical disc 804). In the case of a virgin disc (as described above, in the case of a cluster searched in step S13 constructed only from an allocation block entered as un-written allocation blocks (11) in the volume space bitmap in step S16), recorded data is not actually read-out but it is taken that NULL data is recorded and this NULL data is written into a write buffer.

Then, in step S6, recording data recorded in a prescribed region of the RAM (built-into the EFM.CIRC encoder/decoder 808) is read-out and copied to a position corresponding to the allocation block taken as the write buffer recording target. The one-cluster portion of data written in the write buffer is then recorded to the cluster including the allocation block taken as the recording object.

Next, in step S10, the entry for the volume space bitmap for the written allocation block is changed from an un-written allocation block (11) to a used allocation block (01).

Further, in step S11, it is determined whether or not all of the data has been written. If all of the data has not yet been written, the process goes on to step S12 to modify the file position (write position), and returns to step S1 for repeating the process thereafter. The writing process is then completed when it is determined that all of the data has been written.

On the other hand, in step S4, if it is determined that a used allocation block (01) is included in the cluster including the allocation block taken as the write target, the process goes on to step S7. The one cluster portion of data including the allocation block taken as the recording target from the MD data disc is read and written into the write buffer.

As described above, in this embodiment, actual data is recorded at the used allocation block (01). Therefore, in step S8, it is determined whether or not it was possible to express one cluster portion of data and it is usually determined that writing-in is possible at times of normal operation excluding times of abnormal operation due to the discovery of defects. In this case, the process goes to step S6 and the recording data is written to a position corresponding to the allocation block taken as the write object for the write buffer and the one cluster portion of write buffer data including the allocation data is recorded on a data track of the MD data disc. The process then goes onto step S10 and the entry for the volume space bitmap for the written allocation block is entered as a used allocation block (01).

Then, in the same way as described above, it is determined in step S11 whether or not all of the data has been written and if there is still some un-written data remaining, the process goes on to step S12. The process then returns to step S1 after the file position (writing position) has been modified and the process thereafter is then repeated.

If it is determined in step S8 that expression could not be achieved (for example, if a defect is discovered), the process goes to step S9, error processing is executed and the write process is completed.

As described above, in this embodiment, actual data is always recorded at a used allocation block (00). In other words, regions are secured for recording data as is the case conventionally but allocation blocks in which data is not actually yet recorded are taken as un-written allocation blocks (11) rather than used allocation blocks. These un-written allocation blocks are then determined to be allocation blocks including user allocation blocks (00) in step 4, with a NULL data-writing process then being carried out in step S5.

This embodiment therefore does not require the conventional initialization process (physical formatting) for writing the NULL data.

Figure 15:
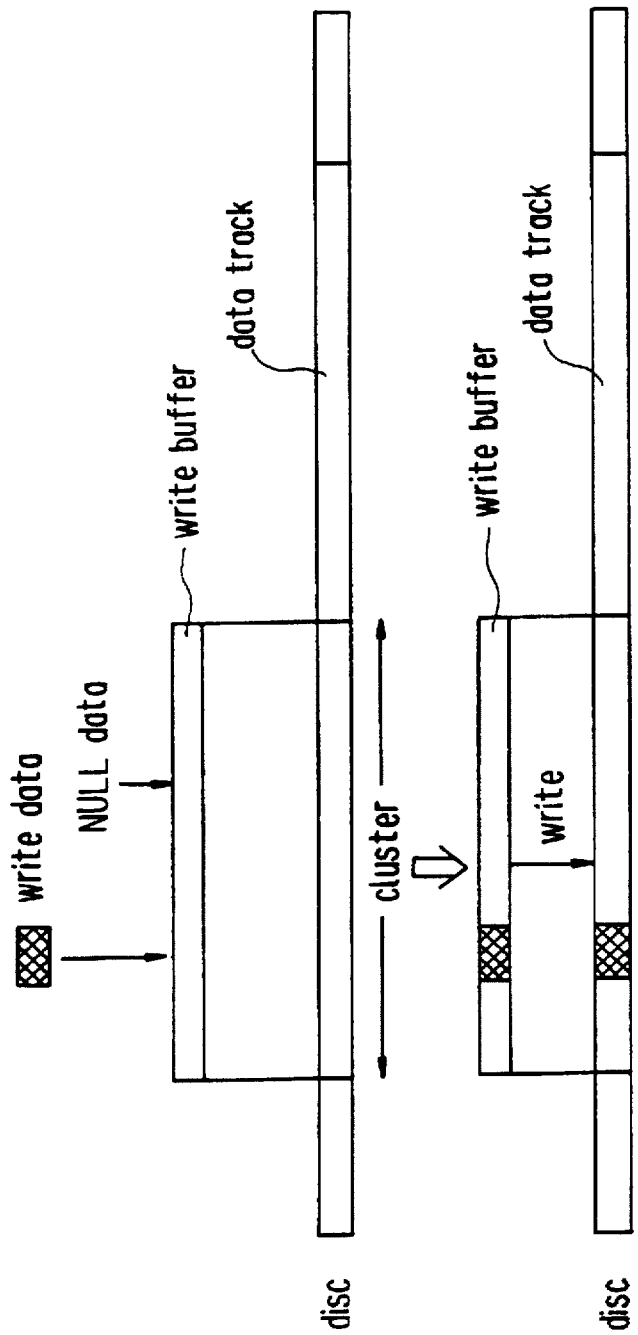
FIG. 15 is a view illustrating the write-in operation for the embodiment of the present invention.

FIG. 15 schematically shows the situation for writing data to a virgin disc. In the same drawing, in the case of recording data to a virgin cluster (a cluster not including the user allocation block (00)), NULL data is initially written to the write buffer. Write data is then written at a position corresponding to the allocation blocks taken as the recording target of the write-buffer. This data is then recorded at a cluster on the data track after a first cluster portion of data is prepared at the write buffer.

In this way, when data is, in practical terms, written to at least one allocation block within the cluster, NULL data or other data will definitely be written to other allocation blocks.

Figure 10:
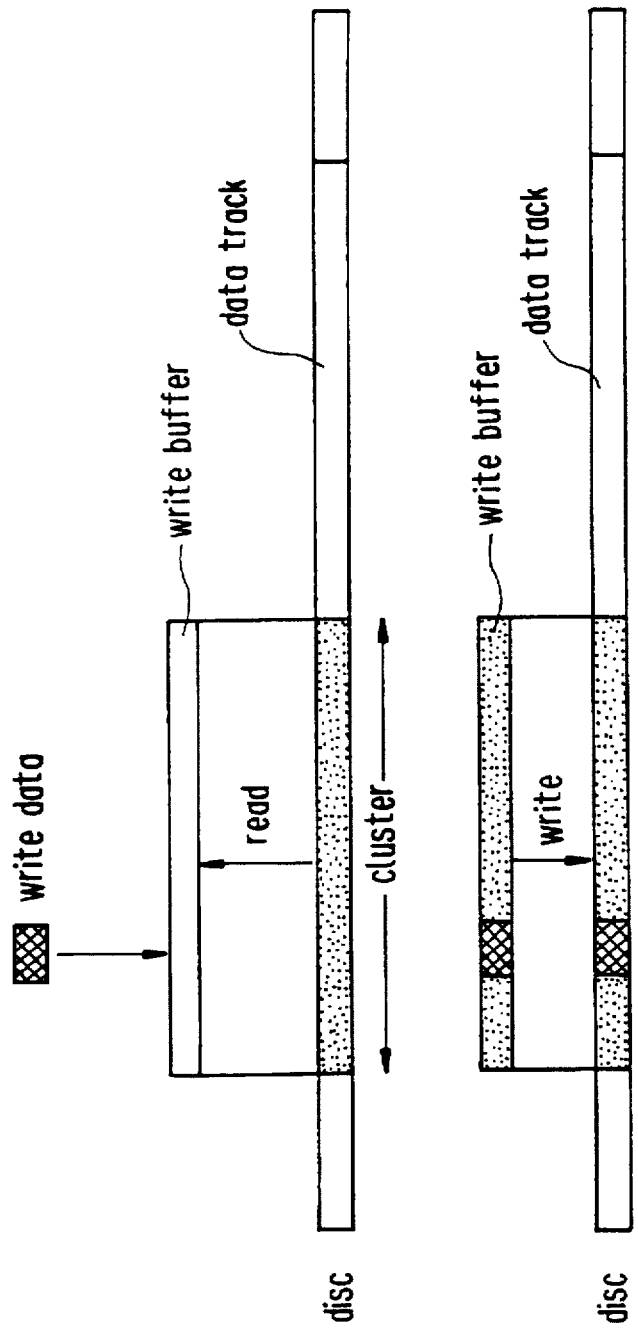
FIG. 10 is a schematic view illustrating a conventional MD data disc write-in operation.
Figure 11:
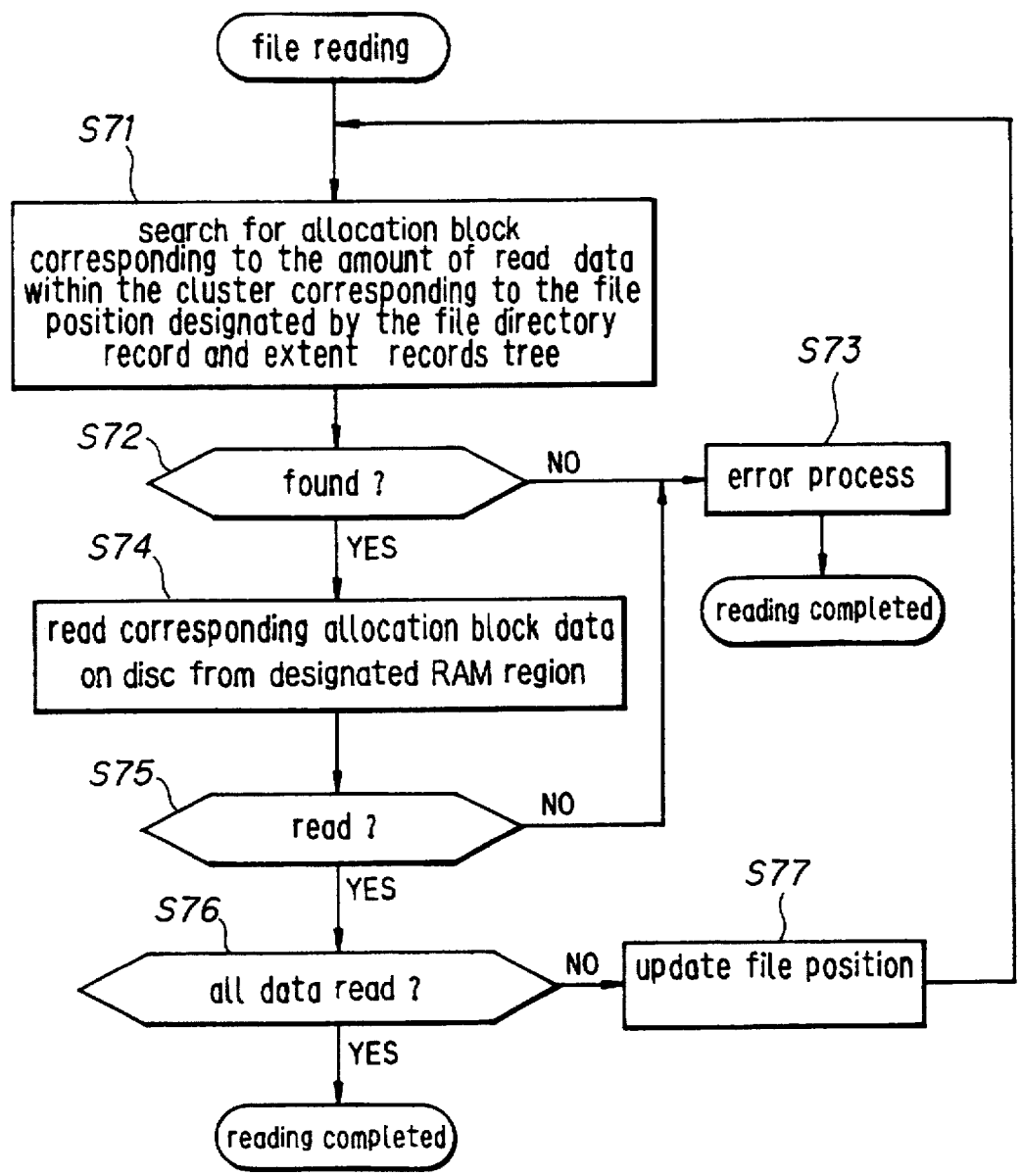
FIG. 11 is a still further flowchart illustrating a conventional MD data disc write-in operation.
Figure 16:
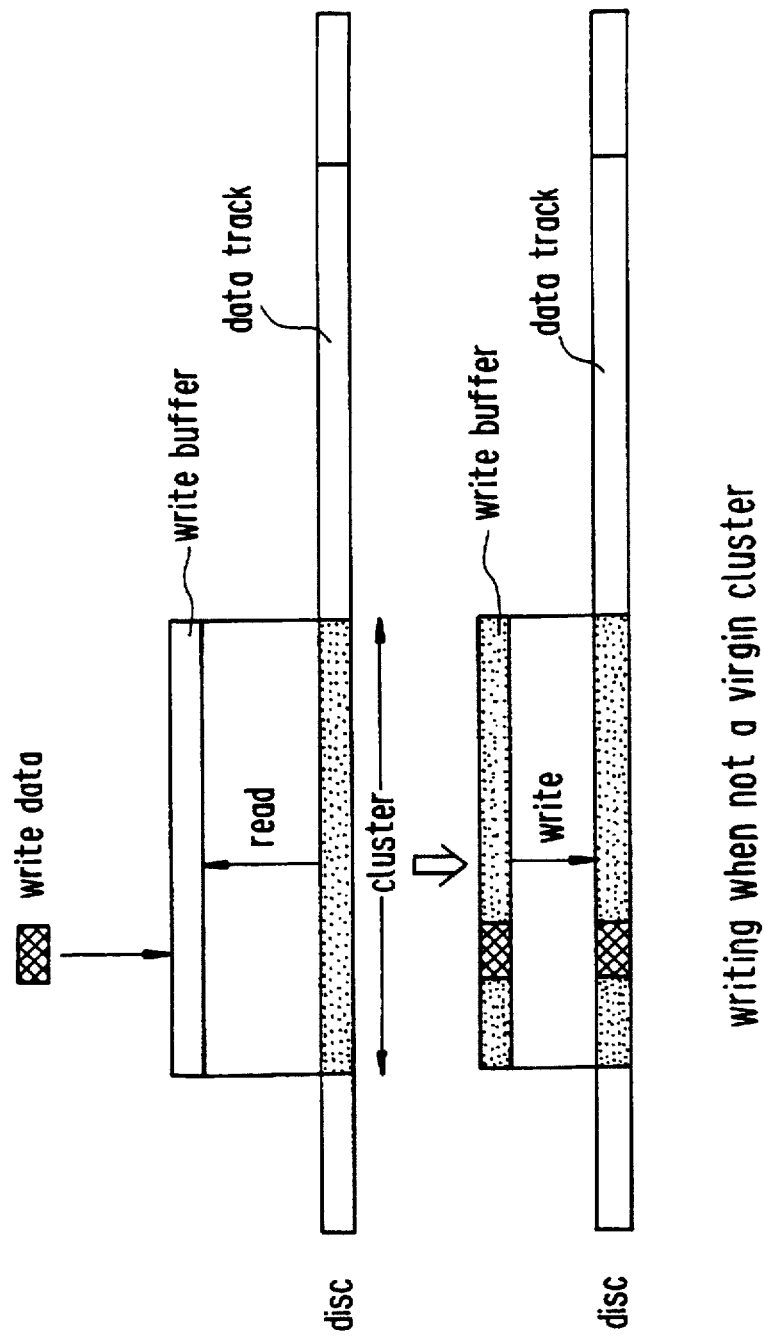
FIG. 16 is a further view illustrating the write-in operation for the embodiment of the present invention.

Therefore, as shown in FIG. 16, when data is written for clusters other than virgin clusters, data recorded at that cluster is read from the data track, written within the write buffer and data at a position corresponding to the allocation block taken as the write target within this write buffer is updated using this new write data (recording data). Data for the first cluster portion recorded at the write buffer is then re-recorded at the cluster on the data track. Write operations to clusters other than this virgin cluster are carried out in the same way as the conventional write operation shown in FIG. 10.

Figure 17:
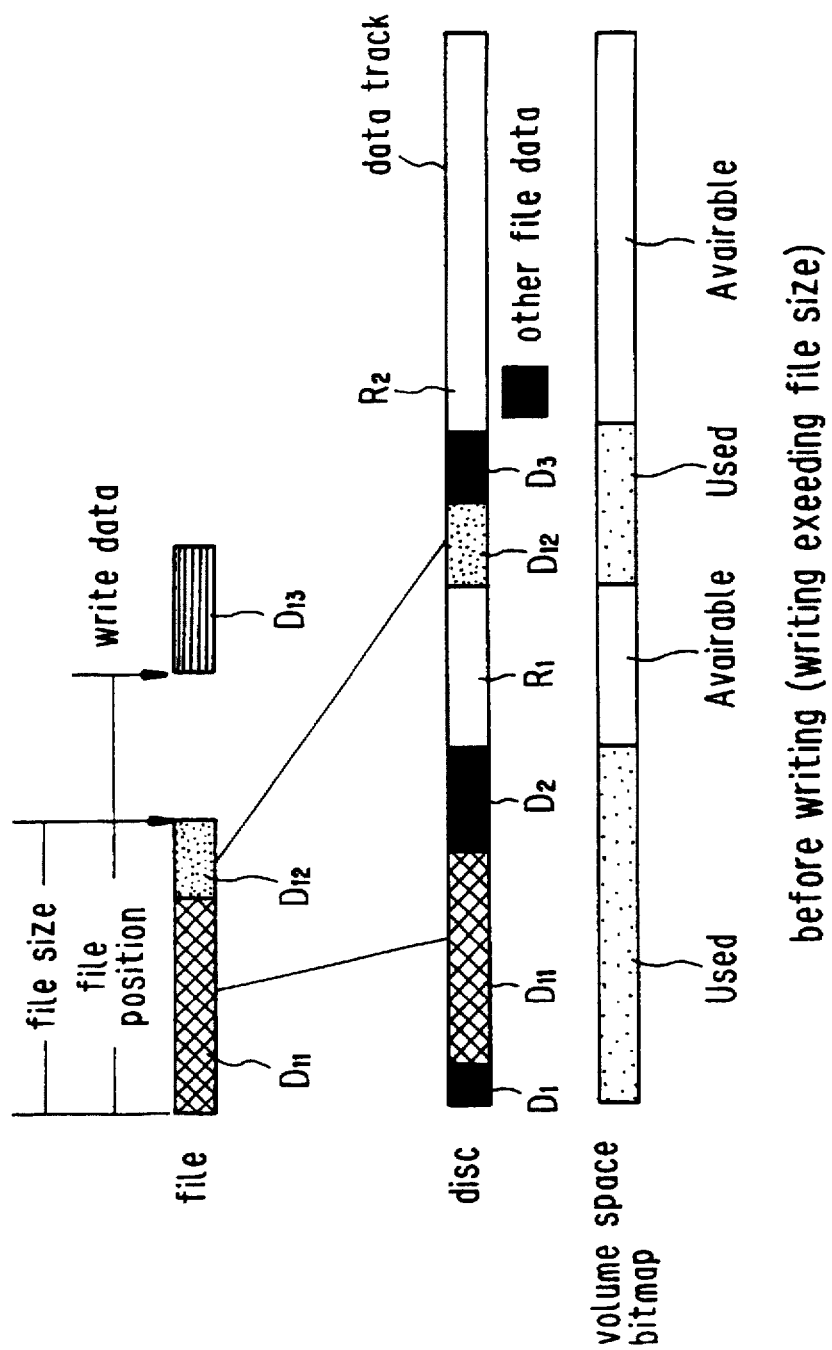
FIG. 17 is a view describing the write-in operation.

Further, the operation for when data for a file that exceeds the size of the file already written is written to a position is described with reference to FIG. 17 to FIG. 20. As shown in FIG. 17, in addition to prescribed file data constructed from the data $D_1$, $D_2$ and $D_3$, data $D_{11}$ and $D_{12}$ for the files taken as the current write target is also recorded at the data track. In this embodiment, the data $D_1$, $D_{11}$ and $D_2$ is recorded in succession, as is the data $D_{12}$ and $D_3$. A data un-written region $R_1$ is then formed between the data $D_2$ and $D_{12}$, with another data un-written region $R_2$ being formed to the rear of the data $D_3$.

The allocation block recorded with the data $D_1$, $D_{11}$ and $D_2$ and the allocation block recorded with the data $D_{12}$ and $D_3$ are then listed as used allocation blocks (00) in the volume space bitmap. With regards to this, other regions $R_1$ and $R_2$ of the data tracks are listed as available allocation blocks (00).

Figure 18:
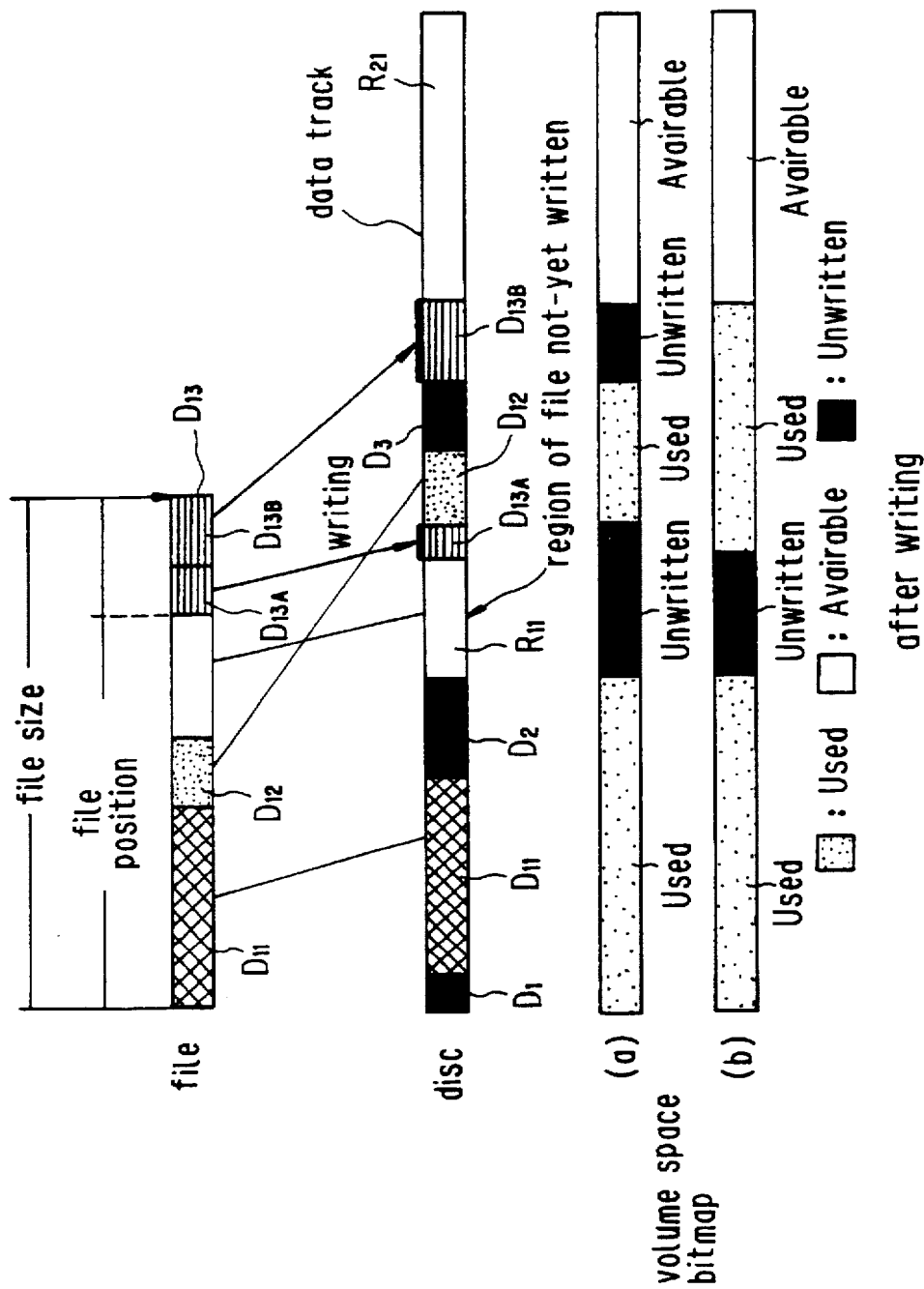
FIG. 18 is a further view describing the write-in operation.

Under these conditions, the recording operation for the case where the file position (recording position) of the newly written data $R_{13}$ is larger than the file size of the already-recorded file (final position of the data $D_{12}$ at the file-end) is shown in FIG. 18.

Namely, first, an allocation block for a position corresponding to the data track region $R_1$ and an allocation block for one part of the region $R_2$ are secured as un-written allocation blocks (11) so as to secure a region for recording the new data $D_{13}$. This means that only the remaining region $R_{21}$ of the region $R_2$ becomes an available allocation block region (FIG. 18(a)).

Data $D_{13A}$ that is one part of the new data $D_{13}$ is then recorded at one part of the un-written allocation block within the region $R_1$ and the remaining data $D_{13B}$ is recorded at an un-written allocation block for a region present up until this point at one part of the region $R_2$. The allocation block recorded with the data $D1_3A$ and $D_3B$ is then updated on the volume space bitmap from an un-written allocation block to a used allocation block (FIG. 18(b)).

In this way, allocation blocks within the un-written region $R_1$ of the data track with the exclusion of the allocation block recorded with the data $D_{13A}$ are allocated as regions for recording file data but in reality remain as un-written allocation blocks un-written with data.

Figure 19:
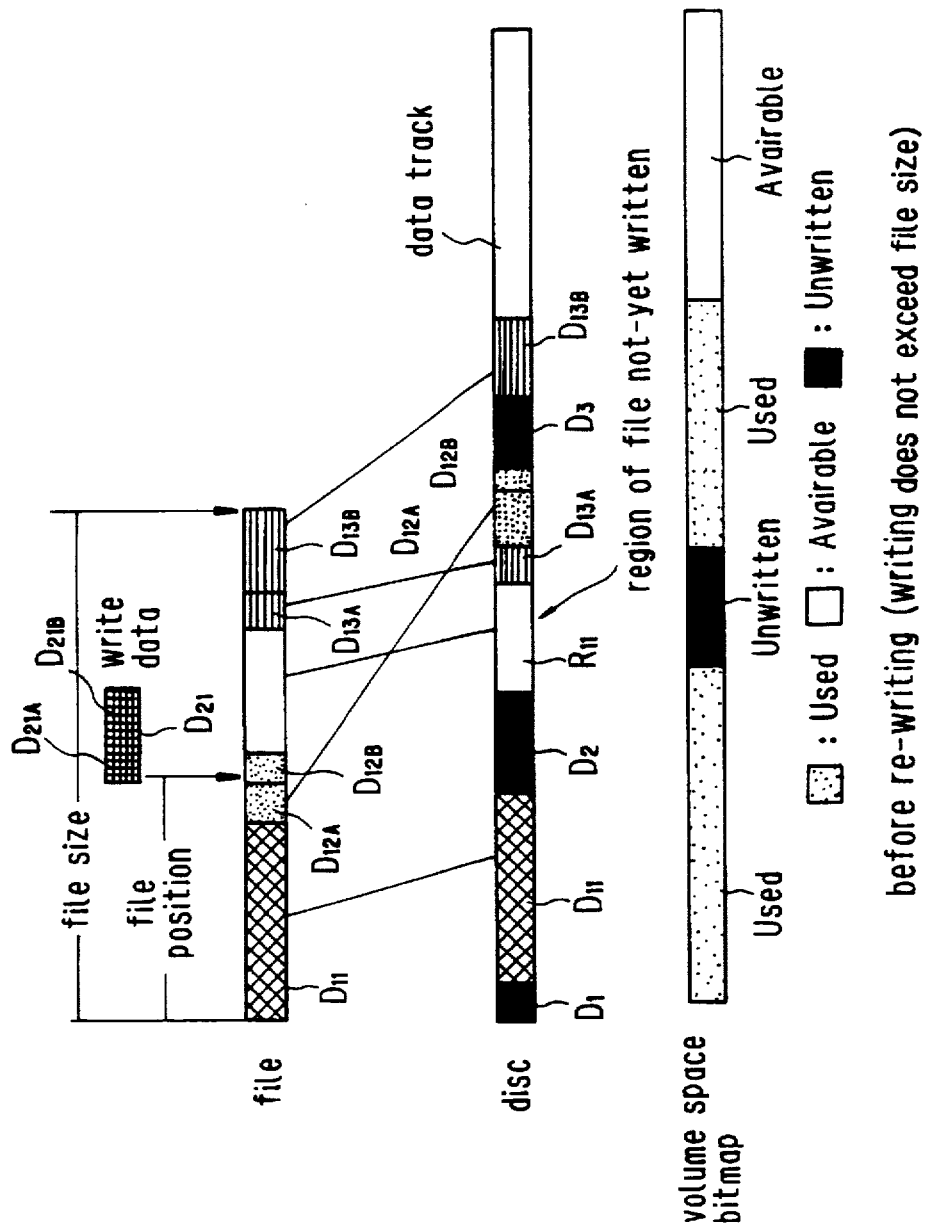
FIG. 19 is a still further view describing the write-in operation.
Figure 20:
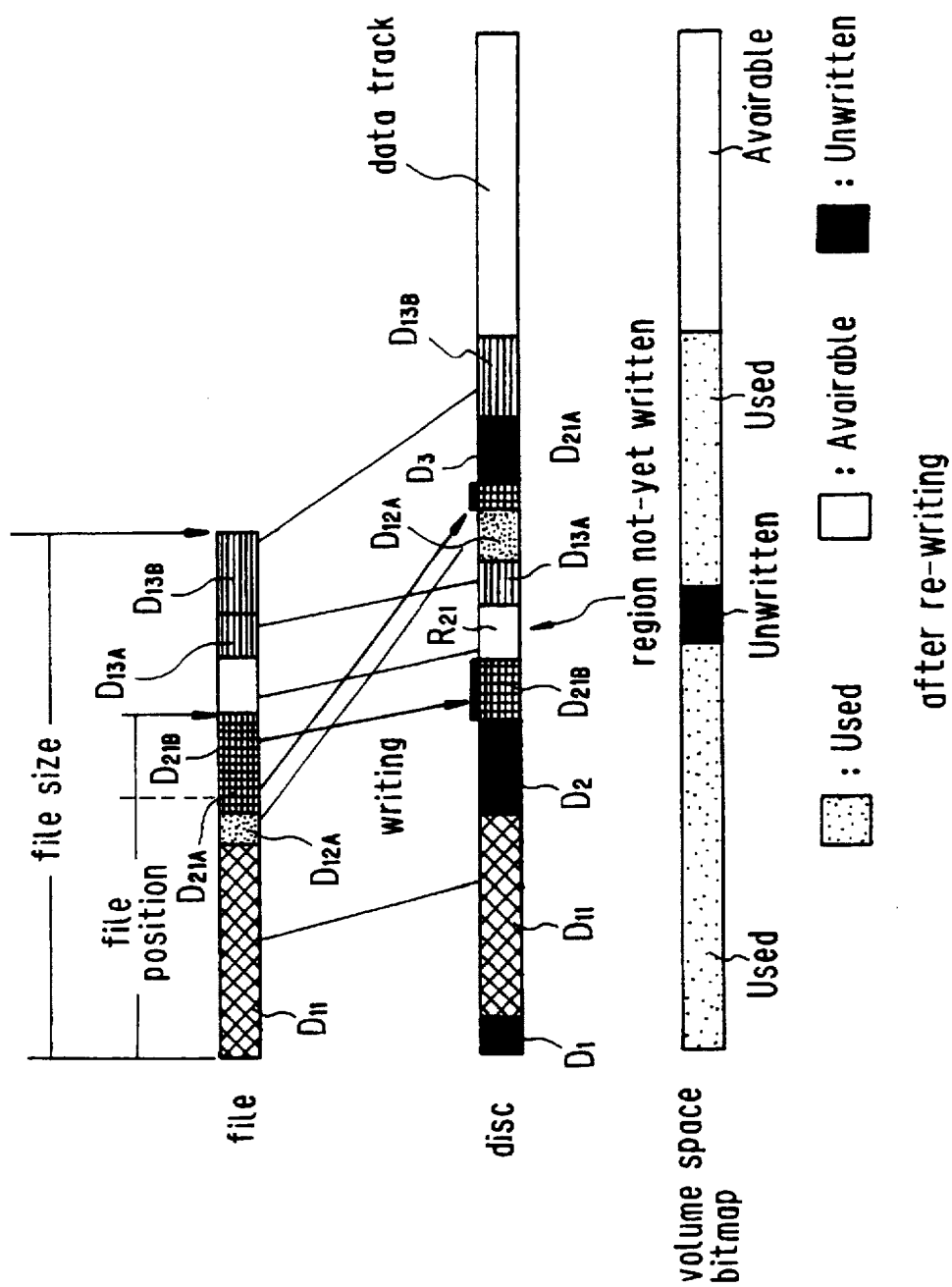
FIG. 20 is another view describing the write-in operation.

Under these conditions, as shown in FIG. 19, the data $D_{12B}$ at the rear end of the data $D_{12}$ is updated with the leading portion data $D_{21A}$ of the new data $D_{21}$. Further, the recording operation shown in FIG. 20 is carried out when the remaining data $D_{21B}$ is also recorded.

Namely, leaving the leading data $D_{12A}$, the data $D_{12}$ on the data track is rewritten with the leading data $D_{12B}$ being replaced by the new data $D_{21A}$. The remaining data $D_{21B}$ of the newly written data $D_{21}$ excluding the data $D_{21A}$ is then recorded at an allocation block at one part of the un-written allocation block on the region $R_{11}$. This has the result that the region recorded with the data $D_{21B}$ of the region $R_{11}$ taken up until this point as an un-written allocation block region is taken as a used allocation block, with the remaining allocation blocks for the region $R_{21}$ remaining as un-written allocation blocks.

Figure 21:
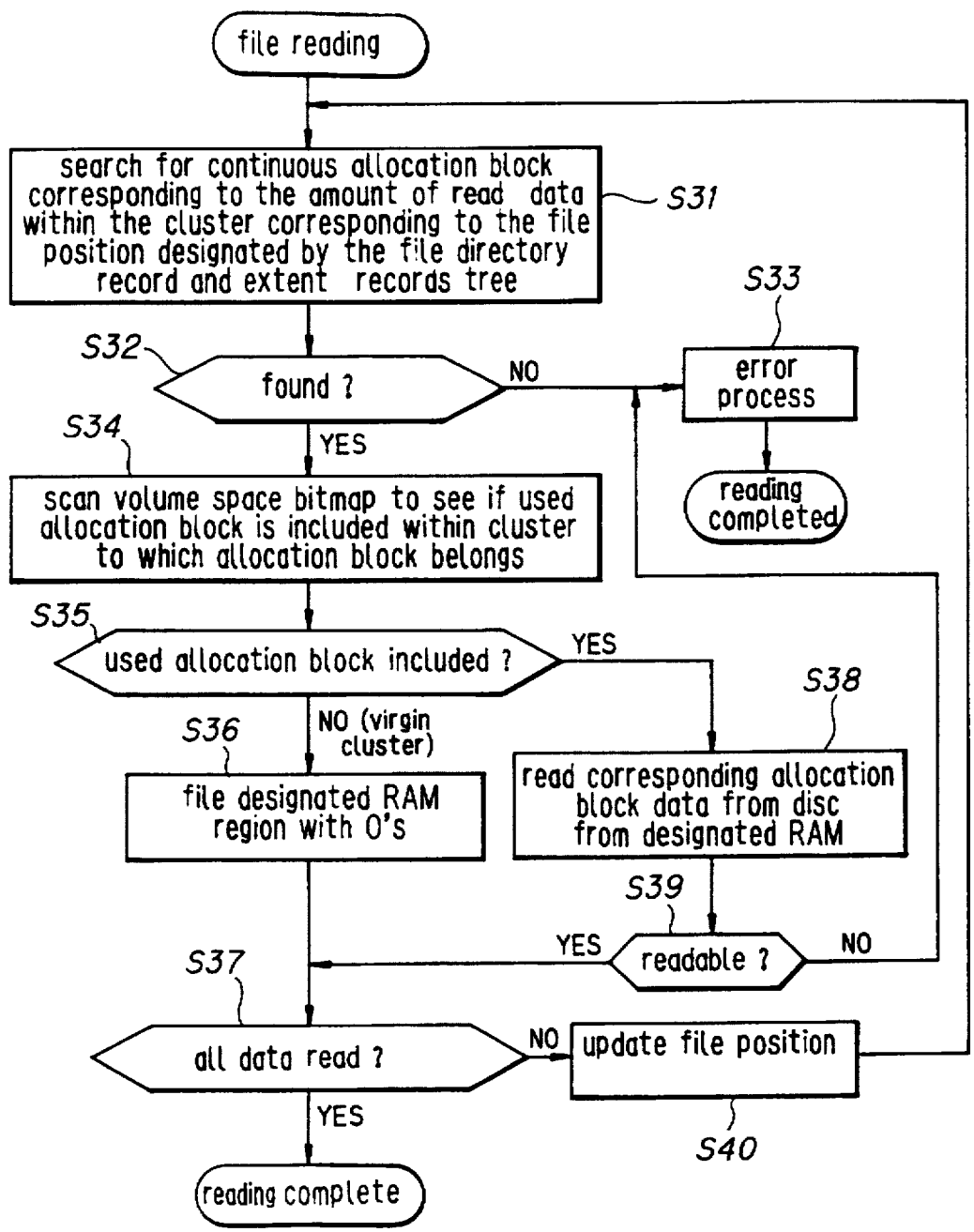
FIG. 21 is a flowchart illustrating the read-in operation of the embodiment.

Next, the process for reading-out file data recorded in the above way is described with reference to the flowchart in FIG. 21. First, in step S31, an allocation block corresponding to the read data amount within the cluster corresponding to a file position (read-out position) designated from the file directory record and the extent record tree is searched for. If an allocation block is not found as a result of the search, the determination in step S32 is such that the process goes on to step S33 to execute an error process, and the read process is completed.

If an allocation block is found in step S32, the process goes to step S34 and the volume space bitmap is scanned to determine whether or not a used allocation block is included within the cluster to which this allocation block belongs. If it is determined in step S35 that a used allocation block is not included, then this cluster is a virgin cluster.

In this case, the process goes on to step S36 and the whole of the RAM for writing in the read data is written with NULL data. This has the effect that in the case where data recorded on a virgin disc is read out because data is recorded on a virgin cluster in the way described above, the case that occurred in the conventional art where read-out was not possible because data was not recorded is prevented. This step S36 means that data can, in practical terms, be read from the virgin cluster even without an initialization process being executed.

If it is determined in step S35 that a used allocation block is included, the process goes on to step S38 and data for the allocation block taken as the read-out target from the data track is read out and then read into a prescribed position in the RAM. In this way, used allocation blocks of this embodiment are allocation blocks that are actually recorded with data, not un-written allocation blocks.

Therefore, in step S39, a determination as to whether or not data can be read can be made during normal operation, with the exception of cases where abnormalities occur at the disc. If abnormalities or the like are then present at the disc, a determination can be made that data cannot be read, the process goes on to step S33, an error process is carried out, and the read process is completed.

After step S36 or step S39, the process goes on to step S37, and it is determined whether or not all of the data has been read out. If there is data remaining that has not been read out, the process goes on to step S40. The process then returns to step S31 after the file position (read-out start position) has been updated with the new position and the same process is repeated. The read-out process is then completed after it has been determined in step S37 that all of the data has been read.

In the above way, according to this embodiment, in the case where data is read from a virgin cluster, there is no need for a process where NULL data is pre-recorded at all the clusters using an initialization process so that virgin clusters do not exist because NULL data is read from virgin clusters and outputted. The user can therefore start using the MD data disc directly after purchase. Further, costs may also be reduced because it is no longer necessary for the manufacturer to prepare MD data discs for which an initialization process has already been carried out prior sale.

Still further, writing to a virgin disc may be carried out more rapidly because processes for actually reading data beforehand are no longer necessary. Reading from a virgin cluster may also be carried out more quickly because processes for reading data from an actual virgin cluster are also no longer necessary.

When an instruction to erase temporarily recorded file data is inputted, the completely recorded data is not actually erased. This allocation block is then listed as an available allocation block, with it being possible to write new data on the completely recorded data. In the conventional management method, recording data was recorded after the reading-out of data actually recorded at this cluster even in the case where data was recorded for clusters (pseudo or quasi-virgin clusters) comprised of allocation blocks for which this type of data was temporarily erased.

In this embodiment, these pseudo or quasi-virgin clusters are handled in the same way as true virgin clusters that are completely not recorded with data because a used allocation block (01) is not included (that is these pseudo-virgin clusters are listed as available allocation blocks (00)). It is therefore possible to write to and read from these pseudo or quasi virgin clusters in a rapid manner in the same way as for real virgin clusters.

In the above, the present invention has been described taking as an example the case of an MD data disc application, but the present invention may also be applied to other data recording media.

According to the data recording medium management method, a used code is recorded as a management code when data is actually recorded at a logical block and an un-written code is recorded when a region has been allotted for recording but data has not yet actually been recorded. It is therefore possible to distinguish between both situations and an initialization process can be omitted.

When prescribed data is recorded at the logical blocks for the first time, prescribed data is recorded at the prescribed logical blocks comprising the recording block, and NULL data is recorded at the remaining logical blocks comprising the recording block. The initialization process can therefore be omitted and more rapid recording is possible.

Furthermore, dummy data is recorded to logical blocks other than the logical blocks for recording the recording data in the case of recording data when the recording block does not include a logical block allotted with a used code. An initialization process for recording NULL data before starting to use the data recording medium is therefore not necessary.

The dummy data is outputted as playback data from the logical blocks upon an instruction to play back data from recording blocks not recorded with data. An initialization process may therefore be omitted and rapid reading is possible.

In addition, the dummy data is outputted as playback data from the logical blocks in the case of playing back data when the recording block does not include a logical block allotted with a used code. An initialization process is therefore not carried out and handling can be carried out in practical terms as though there were data recorded at each logical block.

What is claimed is:

1. A method of managing a data recording medium for recording and playing back data in units of logical blocks, comprising steps of:

managing logical blocks using management flags recorded on the data recording medium;

recording a usable flag as the management flag for the logical blocks available for recording;

recording a used flag as the management flag for the logical block only when data is actually recorded at the managed logical block;

recording an un-written flag as the management flag when the managed logical block is in one of a plurality of data tracks and has been allotted as a region for recording data in which the data has not yet actually been recorded; and recording said un-written flag as the management flag for a not usable logical block when the managed logical block is not in one of said plurality of data tracks.

2. The method according to claim 1, wherein the management flags are recorded at a region different than a region where the data is recorded.

3. The method according to claims 1 or 2, wherein the management flags are employed as flags for indicating regions of the data recording medium other than a region for recording the data.

4. The method according to claims 1 or 2, wherein the management flags include at least one of an available flag indicating the presence of a region for use in recording data and a defect flag indicating the presence of a region having a defect.

5. A data recording medium management system for managing a data recording medium for recording and playing back recorded data in units of logical blocks, comprising:

managing means for managing the logical blocks using management flags;

first recording means for recording a usable flag as the management flag when the logical block is available for recording;

second recording means for recording a used flag as the management flag only when data is recorded at the logical block;

third recording means for recording an un-written flag as the management flag when a logical block is in one of a plurality of data tracks and has been allotted as a region for recording data in which the data has not yet been recorded; and fourth recording means for recording said un-written flag as the management flag for a not usable logical block when a logical block is not in one of said plurality of data tracks.

6. A recording medium for recording and playing back data in units of logical blocks, comprising:

a first region for recording data therein; and a second region for recording therein management data for managing the first region, wherein a usable flag indicating that the logical block is available for recording, a used flag indicating only that data is actually recorded at the logical block, an un-written flag indicating that the logical block is in one of a plurality of data tracks and has been allotted as a region for recording data in which the data has not yet been recorded, and said un-written flag indicating that the logical block is a not usable logical block when it is not in one of said plurality of data tracks are recorded at the second region.

* * * * *